Patented July 18, 1939

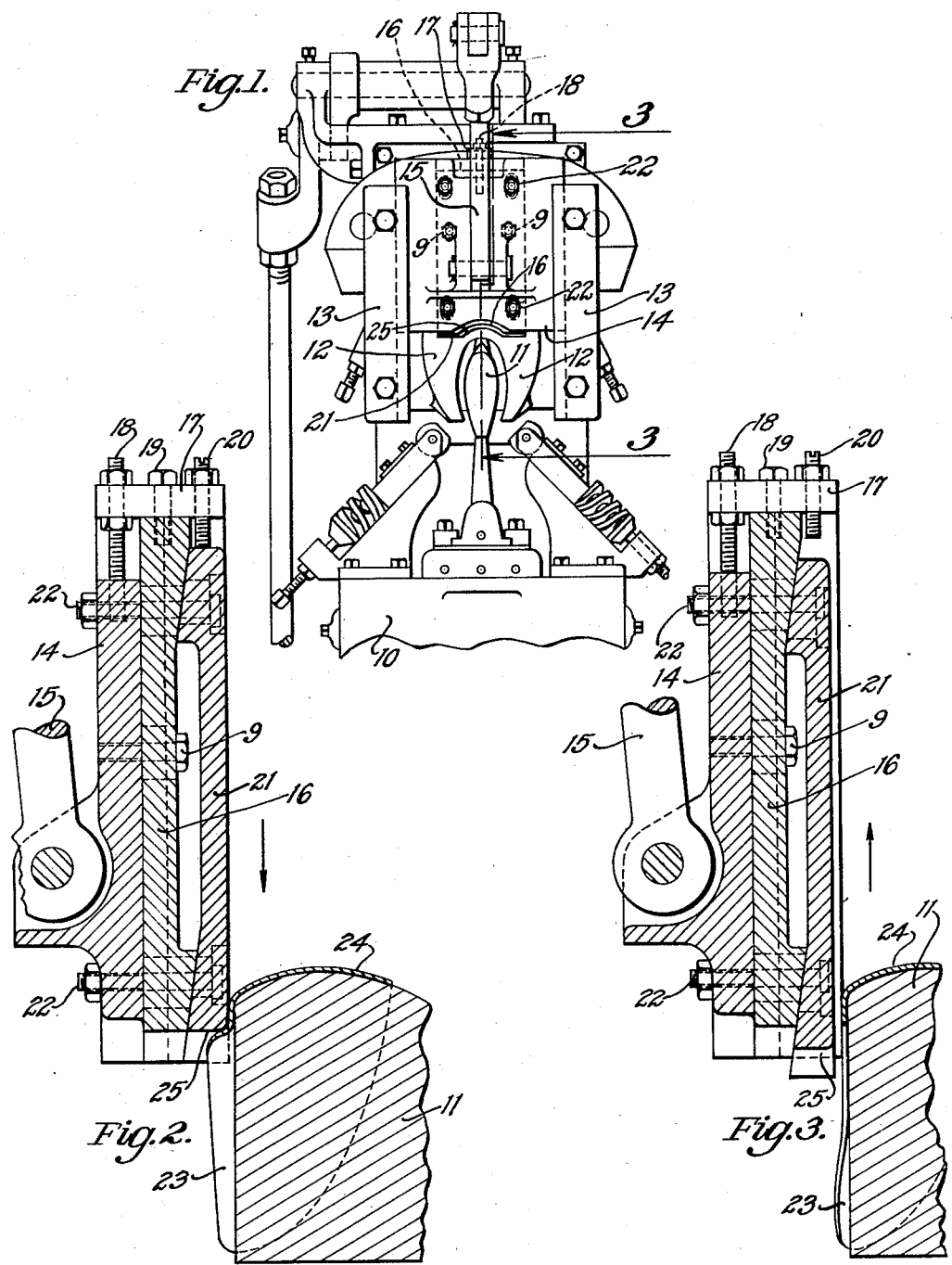

2,166,888

UNITED STATES PATENT OFFICE 2,166,888

COUNTER MOLDING MACHINE

Charles W. Bailey and Jean H. Scharffenberg, Lynn, Mass., assignors to Stewart Bros. Inc., of Lynn, Lynn, Mass., a corporation of Massachusetts Application April 21, 1938, Serial No. 203,324

10 Claims. (Cl. 12—66)

This invention relates to machines for molding counter blanks and consists in improved wiper mechanism for molding the flange portion of the counter, arranged to release its pressure on the flange during its retracting stroke and so eliminate all tendency to disturb the desired smooth convex curvature about the contour of the counter. In one aspect, the invention comprises a counter molding machine having a wiper or flange plate arranged to make its working stroke under full molding pressure and its return stroke under conditions of released pressure.

Counter molding machines are equipped with a center mold or plug and cooperating side molds shaped to engage the body of the blank and impart a permanent curvature thereto. When these molds are closed the marginal portion of the counter projects beyond the face of the molds, and a flange plate is then advanced to engage the upstanding margin of the blank and wipe it forwardly and inwardly upon the face of the center mold, thus forming the horseshoe shaped flange which is subsequently used for attaching the molded counter to the shoe bottom. In counter molding machines as heretofore constructed the wiper or flange plate has been reciprocated in both directions in a predetermined path and has exerted pressure on the flange of the counter both in moving forwardly or downwardly over the face of the molds and in moving rearwardly or upwardly in its return stroke. In dealing with some types of counter stock and under some conditions there is an objectionable tendency of the wiper plate, in its reverse stroke, to displace the material of the counter outwardly or away from the flat face of the center mold. Such counters present an objectionable ridge, referred to in the trade as a "piazza", about the rear portion of the heel seat instead of conforming smoothly in a continuous curve to the contour of the center mold.

The principal object of the present invention is to remedy this defect by improving the construction and arrangement of the flange forming mechanism of the molding machine. As herein shown and in accordance with the preferred embodiment of the invention, the flange plate is mounted to make its working stroke in a predetermined path wherein it exerts full molding pressure upon the inturned flange of the counter and to make its return stroke under conditions of released pressure as, for example, by being displaced in a carrier or by being permitted to shift its position so that in its return stroke it exerts little or no pressure upon the inturned flange of the counter and consequently has no tendency to disturb it or to deform the counter from conformity to the mold surface.

These and other features of the invention will be best understood and appreciated from the following description of a preferred embodiment thereof, selected for purposes of illustration and shown in the accompanying drawing, in which Fig. 1 is a view in front elevation of so much of a counter molding machine as is necessary to a complete understanding of the invention, Fig. 2 is a sectional view on a larger scale showing the flange plate as moving in its working stroke, and Fig. 3 is a similar view showing the flange plate as moving in its retracting stroke.

The machine comprises a frame 10 in which is mounted a center mold or plug 11 having convex side walls and a flat outer face, and a pair of cooperating side molds 12 which are contracted under molding pressures toward the center mold 11 after a counter blank has been inserted in the space between them. The mechanism for operating the side molds is not herein shown, since it forms no part of the present invention. The outer faces of the molds 11 and 12 lie in a single plane and in the molding operation the margin of the counter blank which projects outwardly beyond the face of these molds is wiped downwardly and inwardly upon the face of the center mold to form the flange of the molded counter.

A pair of vertical guides 13 are secured to the frame of the machine and in these guides is movably mounted a carrier plate 14 adapted to be reciprocated vertically through the medium of a link 15 which is pivotally secured to the front of the plate 14. At its upper end the link is connected to the forward end of a rocker arm and thus is oscillated at the proper time in the cycle of the machine by a cam and driving train suggested in part but not fully illustrated in Fig. 1.

A wedge plate 16 having upper and lower inclined surfaces is bolted in face to face engagement with the back of the carrier plate 14 by bolts 9 and is vertically adjustable relative to the carrier plate, since the bolts 9 pass through elongated slots in the wedge plate 16. The wedge plate 16 is secured to a cap bar 17 by a screw 19 and the cap 17 is maintained rigidly but adjustably in place by a bolt 18 tapped in the top of the carrier plate 14 and having lock nuts on both sides of the cap. The cap 17 overhangs the wedge plate 16 somewhat and in the overhanging portion is threaded a stop bolt 20. A wiper plate 21 having upper and lower inclined surfaces on its inner face corresponding with those on the wedge plate 16 is adjustably secured to the assembly of the wedge plate 16 and carrier plate 14 by bolts 22 which operate in slots cut in the flange plate 21 and also in the wedge plate 16.

In Fig. 2 the assembly is shown as it appears on the downward stroke, a counter blank 24 having been properly located in the mold 11. The wedge plate 16 is maintained in fixed position relative to the carrier plate 14. The bolt 20 limits the position of the wiper plate 21, and it will be observed that the bolts 22 are located at the bottom of the slots in the wiper plate 21, although no pressure is exerted by them. The lower edge of the wiper plate 21 contains a recess 25 which fits over the crown of the partially molded counter 24. As the link 15 moves the assembly downward, the wiper plate 21 wipes the flange 23 of the counter 24 inwardly and downwardly until it assumes the position shown in Fig. 3. After completing its full downward stroke the wiper plate assembly is moved upwardly and returned to its initial position.

In Fig. 3 the upward stroke of the assembly is shown as nearly completed. In this movement the wiper plate 21 slides away from the mold 11 on the inclined surfaces of the wedge plate 16 and the upward stroke is thus effected in the absence of pressure on the counter 24.

With the structure above described, it is possible to control very accurately the length of the stroke and the pressure exerted by the wiper plate 21 upon a counter. By loosening the bolts 9 and manipulating the nuts on the bolt 18 the wedge plate is freed and may be adjusted vertically in a path limited by the extent of the slots surrounding the bolts 9 and 22. If the wedge plate 16 is moved upwardly, the effective length of the movement of the wedge plate 16 and the wiper plate 21 is shortened, i. e. with respect to the mold 11 and the counter 24. If the wedge plate 16 is lowered, the length of the stroke with respect to the mold 11 is increased. However, adjustment of the wedge plate 16 has no effect on the amount of pressure exerted by the wiper plate 21 on the counter 24. This pressure may be regulated by manipulation of the stop bolt 20. If the bolt 20 is raised, the wiper plate 21 rides upwardly and outwardly on the inclined surfaces of the wedge plate 16, thus more nearly approaching the mold 11 and exerting greater pressure on the counter 24. Conversely, if the bolt 20 is screwed down, the flange plate 21 is forced inwardly of the wedge plate 16, thus reducing the pressure exerted by it on the counter 24. The consequent change in the length of the movement may be compensated for by adjusting the wedge plate 16 as before described. The adjustment of the pressure and movement is determined by the nature and thickness of the material used in the counters to be molded and will be obvious to those skilled in the art of molding counters.

It will now be apparent that we have invented a molding machine which entirely obviates any danger of improper displacement of the material of the counter, since the flange is turned and formed by pressure exerted only when the flange plate is moving in the direction in which the flange is to be turned.

Having thus described our invention, what we claim as new and desire to secure by Letters Patent of the United States is:

1. A counter molding machine having molds for engaging a counter blank, fixed guides adjacent to said molds, a composite flange plate movable in said guide and being constructed and arranged to be expanded in thickness while making its flanging stroke and to be contracted while making its reverse stroke, and means for reciprocating and consequently alternately expanding and contacting said flange plate.

2. A machine for molding counters, comprising molds for shaping the body of a counter blank, a movable flange plate, and power operated mechanism for reciprocating said plate including a lost motion connection effective in the return stroke of the plate.

3. A machine for molding counters, comprising molds for shaping the body of a counter blank, a reciprocating carrier having a wiper plate movably mounted therein, and a stop positively connecting the wiper plate to the carrier during the working stroke of the machine and arranged to disengage the wiper plate during the return stroke.

4. A machine for molding counters, comprising side and center molds, guides adjacent thereto, a carrier mounted for reciprocation in said guides and having an inclined supporting face, and a wiper plate held upon said face during the working stroke of the carrier and freed for slipping thereon during the return stroke.

5. A machine for molding counters, comprising side and center molds, fixed guides adjacent thereto, a carrier arranged to reciprocate in said guides, and a wiper plate mounted in the carrier for downward movement simultaneously with the carrier in a path determined by said guides and upwardly in a movement delayed with respect to the carrier movement and in a path uncontrolled by said guides.

6. A machine for molding counters, comprising side and center molds, fixed guides adjacent thereto, a carrier arranged to reciprocate in said guides, a wedge plate adjustably secured to said carrier, and a wiper plate mounted in the carrier and positioned by said wedge plate for downward movement simultaneously with the carrier in a path determined by said guides and upwardly in a movement delayed with respect to the carrier movement and in a path uncontrolled by said guides.

7. A machine for molding counters comprising side and center molds, guides adjacent thereto, a carrier arranged to reciprocate in said guides, a wedge member having an inclined supporting face and being adjustably secured to said carrier, and a wiper plate held upon said inclined face during the working stroke of the carrier and freed for slipping thereon during the return stroke.

8. A machine for molding counters, comprising side and center molds, guides adjacent thereto, a carrier arranged to reciprocate in said guide, a wedge plate secured to said carrier and having an inclined supporting face, a wiper plate held upon said face during the working stroke of the carrier and freed for slipping thereon during the return stroke, means for adjusting said wedge plate to vary the effective length of the working movement, and adjustable means for varying the pressure exerted by said wiper plate.

9. In a machine for molding counters, a carrier arranged to reciprocate, a wedge plate secured to said carrier, a wiper plate held against said wedge plate during the working stroke and freed for slipping thereon during the return stroke, means for varying the effective length of the working stroke independently of the pressure exerted by said wiper, plate, and pressure controlling means associated with said wiper plate.

10. A machine for molding counters, comprising side and center molds, guides adjacent thereto, a carrier arranged to reciprocate in said guides, a wiper plate disposed on said carrier, means for varying the length of the movement of the wiper plate, and means for regulating the amount of pressure exerted by said wiper plate independently of its stroke.

CHARLES W. BAILEY.
JEAN H. SCHARFFENBERG.